(12) United States Patent
Drnevich et al.

(10) Patent No.: US 7,985,399 B2
(45) Date of Patent: Jul. 26, 2011

(54) HYDROGEN PRODUCTION METHOD AND FACILITY

(75) Inventors: Raymond F. Drnevich, Clarence Center, NY (US); Ramchandra M. Watwe, Troy, MI (US)

(73) Assignee: Praxair Technology, Inc., Danbury, CT (US)

( * ) Notice: Subject to any disclaimer, the term of this patent is extended or adjusted under 35 U.S.C. 154(b) by 696 days.

(21) Appl. No.: 12/056,718

(22) Filed: Mar. 27, 2008

(65) Prior Publication Data

US 2009/0246118 A1 Oct. 1, 2009

(51) Int. Cl.
*C01B 3/26* (2006.01)
(52) U.S. Cl. .................. 423/652; 423/648.1; 423/650; 423/651; 423/653
(58) Field of Classification Search ............. 423/648.1, 423/650–653
See application file for complete search history.

(56) References Cited

U.S. PATENT DOCUMENTS

| | | | | |
|---|---|---|---|---|
| 4,553,981 | A * | 11/1985 | Fuderer | 48/62 R |
| 6,379,645 | B1 * | 4/2002 | Bucci et al. | 423/655 |
| 2005/0210881 | A1 * | 9/2005 | Balan et al. | 60/780 |
| 2008/0279763 | A1 * | 11/2008 | Snyder et al. | 423/648.1 |
| 2009/0117024 | A1 * | 5/2009 | Weedon et al. | 423/437.1 |

FOREIGN PATENT DOCUMENTS

EP 0341879 * 4/1992

OTHER PUBLICATIONS

Dybkjaer, et al., "Advanced Reforming Technologies for Hydrogen Production", Hydrocarbon Engineering, 1997, pp. 56-65.
Foster Wheeler, "Hydrogen Plants for the New Millennium", Middle East Petrotech, 2001 Conference and Exhibition.
Salerno, et al., "Polygeneration of SNG, Hydrogen, Power, and Carbon Dioxide from Texas Lignite", Report Prepared by Mitretek for NETL, U.S. DOE, Dec. 2004.
Broadhurst, et al., "Effects of Hydrocarbon Feed Type on Operating Costs and Environmental Impact on a Steam Reforming based Hydrogen Plant", AIChE 2005 Spring Meeting.
Miller, et al., "Hydrogen from Coal Multi-Year RD&D Plan", Research Development and Demo Plan, Draft Report Prepared by NETL, U.S. DOE, Sep. 26, 2005.

* cited by examiner

*Primary Examiner* — Jessica L Ward
*Assistant Examiner* — Paul Wartalowicz
(74) *Attorney, Agent, or Firm* — David M. Rosenblum

(57) ABSTRACT

A hydrogen production method and facility in which a synthesis gas stream produced by the gasification of a carbonaceous substance is processed within a synthesis gas processing unit in which the carbon monoxide content is reacted with steam to produce additional hydrogen that is removed by a pressure swing adsorption unit. The tail gas from the pressure swing adsorption unit is further reformed with the addition of a hydrocarbon containing stream in a steam methane reforming system, further shifted to produce further additional hydrogen. The further hydrogen is then separated in another pressure swing adsorption unit.

14 Claims, 3 Drawing Sheets

HYDROGEN PRODUCTION METHOD AND FACILITY

FIELD OF THE INVENTION

The present invention relates to a hydrogen production method and facility in which a synthesis gas stream, produced by the gasification of a carbonaceous feed, is subjected to water-gas shift reactions in a synthesis gas processing system and a steam methane reforming system to produce part of a hydrogen product in the synthesis gas processing system and a remaining part of the hydrogen product in the steam methane reforming system through introduction of a tail gas stream, generated by a pressure swing adsorption unit associated with the synthesis gas processing system, into the steam methane reforming system.

BACKGROUND OF THE INVENTION

Hydrogen has many industrial uses. For example, there exists a continuing need for hydrogen to treat high sulfur content fuels. In addition hydrogen is also seen as a potential replacement for fossil fuels that would otherwise be used in powering motor vehicles.

Gasification is seen as an environmental friendly process that can be used to convert carbonaceous materials, such as coal, petroleum or biomass into a synthesis gas, namely, a gas that contains hydrogen and carbon monoxide. With respect to the generation of hydrogen, the gasification of coal is extremely attractive, given recent price increases for natural gas that is used in the generation of hydrogen through steam methane reforming.

The carbonaceous material is reacted at high temperatures with oxygen addition within a gasifier to produce the synthesis gas. For example, in one type of gasifier that is used in the gasification of coal, the coal is pulverized and fed into the gasifier. The pulverized coal is heated and volatiles are released creating a char. Volatile products and some of the char is reacted with oxygen to form carbon dioxide and carbon monoxide. The char also reacts with carbon dioxide and steam to produce the carbon monoxide and hydrogen. In addition, carbon monoxide and steam also react in a known water-gas shift reaction to produce carbon dioxide and additional hydrogen.

Gasifiers are integrated with processes that generate steam to power steam turbines, utilize the synthesis gas to power gas turbines and also, to generate hydrogen. For such purposes, the synthesis gas generated by the gasifier is processed in a synthesis gas processing system in which additional hydrogen is produced in shift converters in which the synthesis gas undergoes catalyzed water-gas shift reactions. Since a water-gas shift reaction is an exothermic process, the shifted streams are cooled by heat recovery steam generators that can produce export steam to power the steam turbines. The shifted stream that results from the stages of shift conversion are then passed through an acid gas removal unit in which any sulfur species and carbon dioxide are separated from the shifted stream. Typically this is a physical absorption process that is conducted within absorption columns. The resulting purified synthesis gas is then introduced into a pressure swing adsorption unit in which the hydrogen product is separated from the purified shifted stream. The resulting tail gas can be recompressed to be further processed in pressure swing adsorption units to produce additional hydrogen.

Although for all the reasons given above, gasification and combined cycles as described above that utilize gasification are attractive processes, gasification and associated combined cycles are only beginning to be employed and have not found widespread use. The principal reason for this is that gasifiers are new and very expensive facilities that are believed to be only about 85 percent reliable with respect to the supply of hydrogen. Customer required reliability for hydrogen supply is typically above about 98 percent. In addition, gasification facilities take a long time to construct. For all of these reasons, gasification has not replaced the more traditional method of generating hydrogen, namely, steam methane reforming.

As known in the art, in steam methane reforming, natural gas and/or a refinery off-gas is introduced into a hydrotreater to hydrolyze the sulfur species to hydrogen sulfide. Hydrogen sulfide is then removed in a bed that contains zinc oxide or other material that has sulfur removal capability. Steam is added to the resultant purified natural gas and reactant mixture is introduced into reformer tubes located within a furnace as part of a steam methane reformer. The steam methane reformer is tired by burners that burn part of the natural gas and some tail gas produced by the separation of hydrogen. The combustion is supported by air. The flue gases are used in a convective section of the steam methane reformer to produce the required steam. Steam is also produced When the reformed stream leaving the reformer tubes are cooled. Excess steam is exported. The resultant reformed stream is then shifted in a shill conversion unit to produce additional hydrogen and the hydrogen product is separated from the shifted stream in a pressure swing adsorption unit.

As will be discussed, among other advantages, the present invention provides a method of producing hydrogen from a synthesis gas stream generated by a gasifier in a manner that allows for a greater reliability in the supply of hydrogen and therefore, a lower financial risk in constructing the gasification facility by integrating a steam methane reforming system into the gasification facility.

SUMMARY OF THE INVENTION

In one aspect, the present invention provides a method of producing a hydrogen product from a synthesis gas stream formed by gasifying a carbonaceous feed stock.

In accordance with this aspect of the present invention, a feed stream comprising the synthesis gas stream is preheated and introduced into a first shift conversion unit to form a first shifted gas stream. The first shifted gas stream is cooled and introduced into an acid gas removal unit to remove carbon dioxide and sulfur from the first shifted gas stream and thereby form a purified first shifted gas stream. Part of the hydrogen product is then separated from the purified first shifted gas stream in a first pressure swing adsorption unit, thereby to also produce the first tail gas stream. A combined reactant stream is heated in a steam methane reforming system and subjected to steam methane reforming to produce a reformed stream. The combined reactant stream is formed by combining steam with at least part of the first tail gas stream and a hydrocarbon containing stream, after having been preheated. The hydrocarbon containing stream and steam are combined at a rate such that methanation is at least prevented within the steam methane reformer. The reformed stream is cooled and introduced into a second shift conversion unit to produce a second shifted gas stream from the reformed stream. The second shifted gas stream is cooled and a remaining part of the hydrogen product is separated therefrom in a second pressure swing adsorption unit, thereby to also produce a second tail gas stream.

As can be appreciated, in such a method, since a steam methane reformer is utilized, if for any reason and the gasifier becomes unavailable, the flow of the hydrocarbon containing stream can be increased and used to generate hydrogen at about the same rate as the hydrogen produced when the first tail gas is available.

The combined reactant stream can be subjected to steam methane reforming within a reactant section of a steam methane reformer of the steam methane reforming system that is fired by a fuel and the second tail gas stream can be utilized as part of the fuel for firing the steam methane reformer. Part of the first tail gas stream can be used to form the combined reactant stream and a remaining part of the first tail gas stream can also be utilized as part of the fuel for firing the steam methane reforming system.

The first shifted gas stream produced by the synthesis gas processing system can contain between about 75 percent and about 80 percent less carbon monoxide than the synthesis gas stream. The first tail gas stream can contain between about 40 mol percent hydrogen and about 50 mol percent hydrogen and a remaining fraction of the tail gas stream is at least about 90 percent by volume carbon monoxide. A steam to carbon ratio of combined reactant stream can be at least about 1.0, preferably at least about 1.5. In this regard, the term "steam to carbon ratio" as used herein and in the claims means a ratio of steam to carbon atoms contained within the hydrocarbon containing stream and the carbon monoxide introduced by virtue of the first tail gas stream. Other carbon atoms are excluded such as those that exist in the carbon dioxide. Additionally, a hydrogen to carbon monoxide ratio in the reformed stream can be about 3.0 and can increase to a level of at least about 20.0 within the second shifted gas stream.

In accordance with another aspect of the present invention, a method is provided for producing a hydrogen product within a hydrogen producing facility. In this aspect of the present invention, a steam methane reforming system is operated. Such operation is accomplished by heating a combined reactant stream and subjecting the combined reactant stream to steam methane reforming to produce a reformed stream. The reformed stream is cooled and subjected to a water-gas shift reaction to produce a gas stream enriched in hydrogen. Such gas stream is thereafter cooled and hydrogen is separated therefrom through pressure swing adsorption.

At an initial time of operation of the hydrogen producing facility producing all of the hydrogen product is produced from the steam methane reforming system by forming the combined reactant stream from a hydrocarbon containing stream and steam. At a subsequent time of operation of the hydrogen producing facility, the hydrogen producing facility is retrofitted with a synthesis gas processing system configured to produce part of the hydrogen product from a feed gas stream comprising synthesis gas produced by gasifying a carbonaceous feed within a gasifier.

The part of the hydrogen product is produced in the synthesis gas processing system by preheating the feed gas stream and introducing the feed gas stream into a shift conversion unit to form a shifted gas stream. The shifted gas stream is cooled and introduced into an acid gas removal unit to remove carbon dioxide and sulfur from the shifted gas stream and thereby form a purified shifted gas stream. Subsequently, the part of the hydrogen product is separated from the purified first shifted gas stream in a pressure swing adsorption unit, thereby to also produce a tail gas stream.

During the subsequent time of operation, the steam methane reforming system produces a remaining part of the hydrogen product by forming the combined reactant stream by combining the steam with at least part of the tail gas stream and the hydrocarbon containing stream, after having been preheated. The hydrocarbon containing stream and steam are combined at a flow rate such that methanation is at least prevented within the steam methane reformer. As will be discussed, the hydrocarbon and steam can be combined at a higher flow rate if more hydrogen is to be produced. The hydrogen being separated by the pressure swing adsorption being conducted in the steam methane reforming system constitutes the remaining part of the hydrogen product.

As indicated above, the tail gas stream produced by the synthesis gas processing system can be a first tail gas stream and the pressure swing adsorption being carried out in the steam methane reforming system will therefore, produce a second tail gas stream. The combined reactant stream can be subjected to steam methane reforming within a reactant section of a steam methane reformer of the steam methane reformer system that is fired by a fuel. The second tail gas stream can be utilized as part of the fuel for firing the steam methane reformer. Additionally, only part of the first tail gas stream can be used to form the combined reactant stream and a remaining part of the first tail gas stream can also be utilized as part of the fuel for firing the steam methane reformer. Additionally, the first shifted stream can contain between about 75 percent and about 80 percent less carbon monoxide than the synthesis gas stream. The first tail gas stream can contain between about 40 mol percent and about 50 mol percent hydrogen and a remaining fraction of the tail gas stream can be at least about 90 percent by volume, carbon monoxide.

During the initial time of operation the steam methane reformer can operate at a steam to carbon ratio of at least about 2.0 and at a subsequent time of operation, the steam methane reformer operates at a steam to carbon ratio of about 1.0.

As indicated above a hydrogen to carbon monoxide ratio in the reformed stream can be about 3.0 and can thereafter be raised to a level greater than about at least 20.0 by additional shift conversion occurring through the water-gas shift reaction.

The hydrocarbon containing stream can be natural gas. In such case, the hydrocarbon containing stream is preheated and then treated in a hydrotreater to convert sulfur species to hydrogen sulfide. The tail gas stream is preheated and then combined with the hydrocarbon containing stream downstream of the hydrotreater to form a combined stream. The combined stream is introduced into an adsorbent bed to remove the hydrogen sulfide. The combined stream downstream of the adsorbent bed is combined with the steam to form the combined reactant stream.

As is apparent from the description of this aspect of the present invention, an existing hydrogen plant can be retrofitted to advantageously include gasifier. While the gasifier is being constructed, the existing steam methane reforming system can produce hydrogen. Also, the operating steam methane reforming system can be used as a backup should the gasifier become unavailable.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
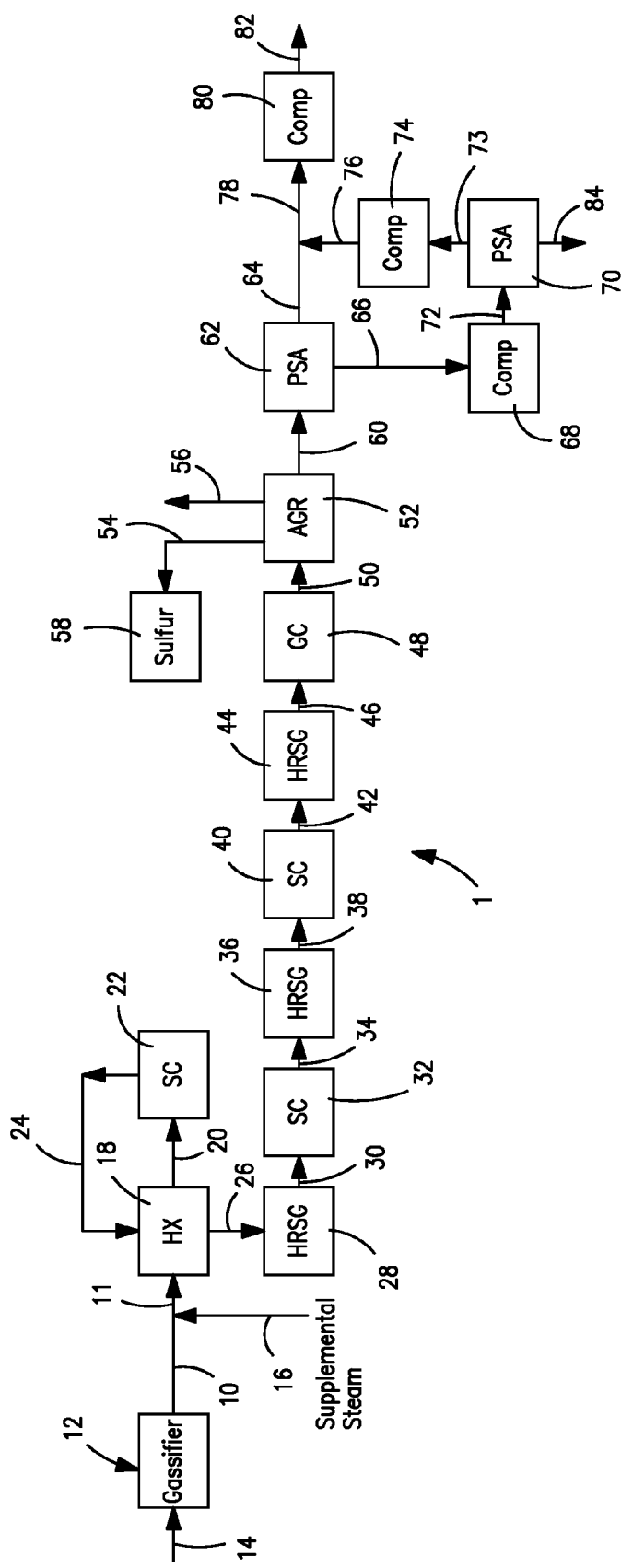
FIG. 1 is a schematic diagram of a synthesis gas processing system of the prior art.

With reference to FIG. 1 a prior art synthesis gas processing system 1 is illustrated that is utilized for generating hydrogen from a synthesis gas stream 10 that is produced by a gasifier 12 in which a carbonaceous feed stock 14 is gasified. For purposes of the present invention, no particular form of the gasifier is preferred. However, typical gasifiers include single stage entrained flow slurry feed gasifiers, two stage entrained flow slurry feed gasifiers, single stage entrained flow dry feed gasifiers, and fluid bed. The subsequent discussion is based on the use of a single stage entrained flow slurry feed gasifier producing a synthesis gas stream 10 at a pressure in excess of about 500 psig.

A supplemental steam stream 16 may be added to the synthesis gas stream 10 if required to drive the shift conversion reactions that will be discussed. Stream 10 either alone or combined with supplemental steam stream 16 is passed as a feed stream 11 through a heat exchanger 18 ("HX") to preheat the synthesis gas stream. The preheated feed stream 20 then passes through an initial shift conversion unit 22 to produce a shifted gas stream 24. In this regard the term "shift conversion unit" as used herein and in the claims means a reactor in which carbon monoxide and water are reacted to produce carbon dioxide and hydrogen. Typical shift conversion units employ a catalyst such as magnetite or other transition metals and transition metal oxides.

Shifted gas stream 24 leaving the initial shift conversion unit 22 typically contains between about 75 percent to about 80 percent less carbon monoxide than the incoming synthesis gas stream 10 as a result of the water-gas shift reaction occurring within such unit and as such, contains more hydrogen than the synthesis gas stream 10. Since the shift conversion is an exothermic process, the temperature of shifted gas stream 24 is typically between about 250° F. and about 300° F. higher than the incoming preheated feed stream 20. Shifted gas stream 24, after passage through heat exchanger 18, is then passed as stream 26 through heat recovery steam generator 28 "HRSG". Normally, there is sufficient heat in stream 26 to convert boiler feed water into steam by indirect heat exchange. It is to be noted that heat recovery steam generator 28 and like devices illustrated with the notation "HRSG" in the figures that generate steam can be used in conjunction with a steam turbine to generate electricity or as steam for export.

The resulting partly cooled shifted stream 30 can be about 520° F. when it enters a secondary shift conversion unit 32. A further shifted gas stream 34 leaves the secondary shift conversion unit 32 at a temperature of about 575° F. About 70 percent of the carbon monoxide contained within partly cooled shifted gas stream 30 is converted to hydrogen making the total conversion by the two stages of shift to be between about 93 percent and about 94 percent. Further shifted gas stream 34 is then cooled in a heat recovery steam generator 36 to produce steam. The resulting partially cooled further shifted gas stream 38 is then introduced into a tertiary shift conversion unit 40 at a temperature of about 480° F. where additional carbon monoxide conversion occurs. The resulting yet further shifted gas stream 42 contains about 2 percent of the carbon monoxide contained within the incoming synthesis gas stream 10 which represents 98 percent a carbon monoxide having been converted to hydrogen.

Further shifted gas stream 42 is introduced into heat recovery steam generator 44 to raise yet additional steam and the partially cooled further shifted gas stream 46 exits heat recovery steam generator 44 where it is further cooled within a gas cooler 48. Gas cooler 48 is a series of heat exchangers in which the indirect heat exchange produces a lower pressure stream by heating boiler feed water and rejecting low level heat to boiler feed water and to the atmosphere typically through the use of cooling water. Although not illustrated, the heated boiler feed water can then, in a manner known in the art, be de-aerated and passed into a boiler to raise low quality steam that is drawing from a header or steam drum as feed to the heat recovery steam generators labeled as "HRSG".

As a result of the gas cooling within gas cooler 48, most of the water that is not used in the shift conversion process is condensed. The resulting cooled further shifted stream 50 is at a temperature close to ambient and is introduced into an acid gas removal unit 52 "AGR". The reason for the near ambient temperature in acid gas removal unit 52 is that physical sorbents, such as methanol, are more efficient when absorption occurs at lower temperatures. In acid gas removal unit 52, a physical absorbent such as methanol is used to absorb the sulfur compounds and the carbon dioxide in an adsorbent tower having mass-transfer contacting elements to contact the physical adsorbent with the cooled, further shifted gas stream. Absorbent regeneration in such a unit, as is well known in the art, can be accomplished so that one desorbed stream is high in sulfur compounds namely stream 54 and the other stream 56 is nearly pure carbon dioxide. Stream 54 is sent to a unit 58 "SULFUR" in which sulfur compounds are either converted to sulfuric acid or to elemental sulfur for sale to the chemical market in known Claus reaction units that can incorporate downstream catalytic stages to separate the sulfur. The carbon dioxide contained within stream 56 can be captured and used for enhanced oil recovery or injected into deep saline aquifer for sequestration.

The resulting purified shifted stream 60 contains between about 96 mol percent and about 98 mol percent hydrogen and is introduced into a pressure swing adsorption unit 62. As also well known in the art, pressure swing adsorption unit 62 contains beds of adsorbent, namely, beds containing layers of alumina, treated carbon and zeolites that operate out of phase such that as one bed is adsorbing another bed is being regenerated to produce a hydrogen stream 64. Hydrogen stream 64 represents a recovery of about 88 percent of the hydrogen contained within purified shifted stream 60 and is produced at a purity in excess of about 99.9 mol percent.

A resulting tail gas stream 66 generated by regeneration of the beds of pressure swing adsorption unit 62 contains more than about 80 mol percent hydrogen and less than about 50 mol percent carbon monoxide. Tail gas stream 66 can be compressed in a compressor 68 "COMP" and then fed to another pressure swing adsorption unit 70 as a compressed stream 72. Between about 82 percent to about 88 percent of the hydrogen in compressed stream 72 is recovered in hydrogen stream 73 at a purity of about 99.9 mol percent hydrogen. Depending upon the selected operating pressures and the product hydrogen requirements an optional compression stage 74 produces a compressed hydrogen stream 76 that can be combined with hydrogen stream 64 to produce a hydrogen product stream 78 that depending upon product requirements, can be yet further compressed to delivery pressure by a product compressor 80, thereby to produce a compressed hydrogen product stream 82. The tail gas stream 84 of pressure swing adsorption unit 70 can be used to produce additional steam by duct burners and the like firing into heat recovery steam generators.

Figure 2:
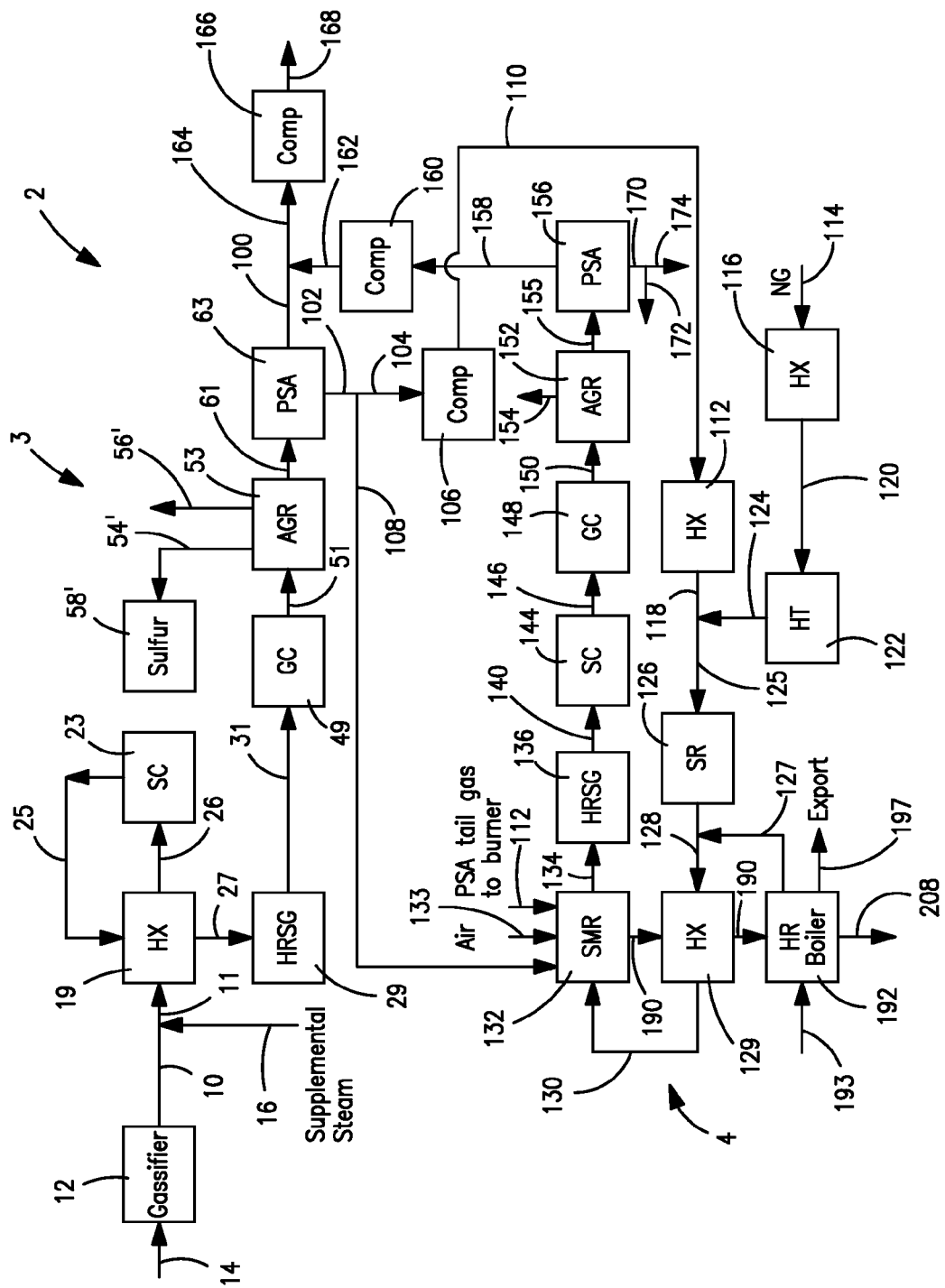
FIG. 2 is a schematic representation of a hydrogen producing facility that is used to carry out a method in accordance with the present invention.

With reference to FIG. 2 a hydrogen production facility 2 in accordance with the present invention is illustrated. Hydrogen production facility 2 has a synthesis gas processing system 3 that is connected to a steam methane reforming system 4. Synthesis gas processing system 3, as compared to synthesis gas processing system 1, only has a single stage of shift conversion because the required shift conversion will also be carried out within steam methane reforming system 4. As such, synthesis gas processing system is less expensive to fabricate and erect than the system illustrated in FIG. 1. In addition, steam methane reforming system 4 could be an existing unit within a hydrogen production facility that is retrofitted with synthesis gas processing system 3 at a later date. Alternatively, the entire hydrogen production facility 2 could be built at the same time so that in any event, steam methane reforming system 4 could function to provide a backup source of hydrogen. It is to be noted that the various items of equipment shown in FIG. 2 having the same designation as in FIG. 1, for example, "HX", "HRSG", "GC" and "PSA" also have the same description that was provided for in FIG. 1.

With respect to the synthesis gas processing system 2, a first shift conversion unit 23 is provided to produce a first shifted gas stream 25 from feed stream 11 that will typically contain between about 75 percent and about 80 percent less carbon monoxide than the incoming synthesis gas stream 10. As can be appreciated, there could be more stages of shift conversion such as first shift conversion unit 23. Likewise, there could have been more stages of shift conversion provided within synthesis gas processing system 1.

First shifted gas stream 25 is then cooled within a heat exchanger 19, a heat recovery steam generator 29 and a gas cooler 49 to produce stream 27, partly cooled first shifted gas stream 31 and a fully cooled first shifted gas stream 51, respectively, all in a manner similar to the system illustrated in FIG. 1. The fully cooled first shifted gas stream is cooled to near ambient temperature and then introduced into acid gas removal unit 53. Because of the reduced level of shift conversion, the carbon dioxide stream 56' that is produced by acid gas removal unit 53 is between about 80 percent and about 90 percent of that captured in acid gas removal system 52 when utilized in connection with the synthesis gas processing system 1 shown in FIG. 1. A stream 54' containing sulfur is also produced that is processed within a unit 58' having the same description as unit 58. The resulting purified first shifted gas stream 61 can contain between about 85 mol percent hydrogen and about 13 mol percent carbon monoxide.

After passage of the purified first shift gas stream 61 through first pressure swing adsorption unit 63, a first hydrogen product stream 100 is produced that has a purity in excess of 99.9 mol percent. A first tail gas stream 102 is also produced and contains anywhere from between about 40 mol percent and about 50 mol percent hydrogen, with carbon monoxide representing more than about 90 percent of the remaining gas volume.

In the embodiment illustrated in FIG. 2 a part 104 of the first tail gas stream is compressed in a compressor unit 106. A remaining part 108 is used for firing the steam methane reforming system 4. However, this is optional and all of first tail gas stream could be introduced into compressor 106 and then compressed to form compressed tail gas stream 110. Typically, compressed tail gas stream 110 is at a pressure of about 500 psig. This compression is done so that the compressed tail gas stream 110 can be fed into steam methane reforming system 4 that utilizes other hydrocarbon containing gases at pressure. Depending on the hydrocarbon gas used, more or less compression could be required and in some instances, compression is not required. In any case, the compressed tail gas stream is then used as a feed to steam methane reformer system 4 to produce a remaining part of the hydrogen to be produced by the illustrated hydrogen production facility 2.

Compressed tail gas stream 110 is heated within a heat exchanger 112. A hydrocarbon containing stream 114 is similarly heated in a heat exchanger 116. Hydrocarbon containing gas stream 114 can be formed of natural gas or refinery off-gases. The resultant pre-heated streams 118 and 120 are typically at a temperature of about 750° F. after such preheating. Heated stream 120 is then introduced into a hydrotreater 122 ("HT"). A small amount of hydrogen product, not shown, can be used to produce a hydrogen sulfide containing stream 124. If instead of natural gas, a stream of refinery off-gases were used, the hydrotreater will convert the olefins to paraffins which is necessary to prevent carbon formation and catalyst used in the steam methane reformer 132 to be discussed.

The hydrogen sulfide containing stream 124 is combined with the heated stream 118 to form a combined stream 125. Combined stream 125 is sent to a sulfur removal unit 126 that typically contains zinc oxide beds to adsorb the hydrogen sulfide and the hydrogen sulfide will be removed to levels down to about 0.1 ppm by volume. Hydrogen sulfide containing stream 124 or in other words, the hydrocarbon containing stream 114 in which the sulfur species has been converted to hydrogen sulfide, can constitute anywhere from between about 5 mol percent and about 85 mol percent of combined stream 125. The relative quantity of hydrocarbon containing stream 114 will depend upon the size of the gasifier 12, the size of the steam methane reforming system 4 selected for integration, the composition of the hydrocarbon containing stream 114 and the relative output of hydrogen of synthesis gas processing system 3 relative to its design capacity.

The hydrocarbon containing stream 114 is combined with the tail gas contained within compressed tail gas stream 110 and a steam stream 127, at a minimum rate to prevent methanation that would otherwise occur within a steam methane reformer 132 (to be discussed) if the tail gas were used alone due to equilibrium conditions existing within steam methane reformer 132. The introduction of the hydrocarbon containing stream 114 produces some degree of steam methane reforming within the steam methane reformer 132. However, it is understood that the present invention is not limited to such a minimum introduction rate of the hydrocarbon containing stream 114 and such stream could be combined at a greater rate to produce more hydrogen.

The required flow rate of the hydrocarbon containing stream 114 and steam stream 127 to prevent methanation or to produce more hydrogen is simply a matter of well known equilibrium calculations that are routinely completed in the operation of any steam methane reformer. For example, if the synthesis gas processing system 3 produces 15 MMSCF per hour of hydrogen, the steam methane reforming system 4 is designed to produce 4.2 MMSCF per hour of hydrogen and the hydrocarbon containing stream 114 is natural gas, the hydrocarbon containing stream 114 would have a flow rate that would typically represent slightly less than 10 mol percent of the volume of combined stream 125 to prevent methanation. On the other hand, if one wanted to increase the hydrogen production of the hydrogen production facility 2, more hydrogen could be produced in steam methane reformer unit 4 by increasing the flow rate of the hydrocarbon containing stream 114. In an alternative in which the steam methane reforming system 4 is constructed first, all of the feed would be the hydrocarbon containing stream 114 to produce all of the hydrogen product of hydrogen production facility 2. At a later date, the retrofitting of the facility with the addition of synthesis gas processing system 3 would allow some of the feed to comprise all or part of the first tail gas stream 102.

It is to be noted, that the incoming hydrocarbon containing stream 114 depending on the source might not have sulfur and as such hydrotreater 122 and sulfur recovery unit 126 might not be used. It is of course possible to place the same upstream of the steam methane reforming system 4 in which case, they would not be a part of such system.

The resultant combined stream 125 after passage through sulfur recovery unit 126 is mixed with steam stream 127 to produce a combined reactant stream 128. The ratio of steam and carbon, as indicated above which would be the sum of carbon within the hydrocarbon atoms plus the carbon atoms within the carbon monoxide should be at least about 1.0 and preferably greater than about 1.5. It is to be noted that at an initial time of operation of steam methane reformer 4, when compressed tail gas stream 110 is not available, the steam to carbon ratio would be at least about 2.0. The combined reactant stream 128 is heated against a flue gas stream 190, to be discussed, within a heat exchanger 129 to a temperature of generally between about 1000° F. and about 1200° F. to produce a heated combined reactant stream 130 that is introduced into steam methane reformer 132.

As will be discussed, steam stream 127 is formed by heating boiler feed water to steam in heat exchangers 192 in which boiler feed water is heated to steam and steam is then superheated to form steam stream 127.

A heated combustion air stream 133 is used to support combustion of a part 172 of a second tail gas stream 170 produced in a second pressure swing adsorption unit 156 along with a remaining part 108 of first tail gas stream 102 to fire the steam methane reformer 132 and thereby to support the steam methane reforming reactions occurring therein. Alternatively, natural gas could solely be used or natural gas mixed with part 172 of second tail gas stream 170, to be discussed. As well known in the art, in steam methane reforming, methane reacts with steam over, typically, a nickel catalyst contained in reformer tubes, to produce carbon monoxide and hydrogen. At the same time, water-gas shift reactions, described above, take place to produce additional hydrogen. Since the steam methane reforming reactions are by and large endothermic, the combustion supplies the heat necessary to drive the reactions.

Since a large portion of the heated combined reactant stream 128 is carbon monoxide and in the typical operation of the hydrogen production facility 2, only a relatively small portion of such stream are hydrocarbons, the energy required for the steam methane reformer 132 can be about 25 percent of that required when the furnace operates on natural gas as the only feed. The major function performed by the reforming catalyst in steam methane reformer 132 under such typical reaction conditions is to convert the carbon monoxide contained within the combined reactant stream 128 to hydrogen through shift conversion. The hydrogen to carbon monoxide ratio of the combined reactant stream 128 entering the steam methane reformer 132 as heated combined reactant stream 130 is nominally about 1.0 to produce a reformed stream 134 having hydrogen to carbon monoxide ratio of higher than about 3.0. Additionally, the combined reactant stream 128 preferably has a steam to hydrogen ratio of at least about 1.5 and preferably higher than 2.0. The higher steam to hydrogen ratio will minimize the occurrence of metal dusting upstream of the steam methane reformer. Metal dusting leads to degradation of the metallurgy of piping and other equipment that processes a stream containing a high concentration of carbon monoxide gas.

Reformed stream 134 is cooled in heat recovery steam generator 136. The resulting cooled reformed stream 140 then enters into a second shift conversion unit 144 where the hydrogen to carbon monoxide ratio is increased to about 20 to produce a second shifted gas stream 146. Second shifted gas stream 146 is then introduced into a gas cooler 148 where its temperature is reduced to about ambient. The resulting fully cooled second shifted gas stream 150 can be sent to an acid gas removal unit 152 to produce a carbon dioxide stream 154 and a purified second shifted gas stream 155 that can contain between about 60 mol percent hydrogen and about 25 mol percent carbon dioxide. However, the acid gas removal step is optional.

In the illustrated embodiment, high temperature shift conversion is used in the second shift conversion unit 144, namely, the cooled reformed stream 140 is introduced into such shift conversion unit at an inlet temperature of about 600° F. Also optional (not shown) is the use of another heat recovery steam generator and third stage of shift conversion prior to the gas cooling unit. In such case, the third stage could be a high temperature, medium temperature or low temperature shift conversion unit. In this regard, a medium and low temperature shift conversion units could be used that operate at inlet temperature of between about 300° F. and about 500° F. It is to be noted that first shift conversion unit 23 should also be a high temperature shift conversion unit to be sulfur and chlorine tolerant. If acid gas removal is used the same sorbent is used in unit 152 as that used in unit 53 so that only an absorber is required in 152 and desorption is performed in combination with the desorption taking place in unit 53.

The purified second shifted gas stream 155 is sent to a second pressure swing adsorption unit 156 in which a second hydrogen product steam 158 is produced that becomes the remaining part of the hydrogen product to be produced by the hydrogen production facility. Optionally, part of second hydrogen product stream 158 could be recycled and combined with hydrocarbon containing stream 114. Second product stream 158 can also optionally be compressed in a compression unit 160 to produce a compressed product stream 162 that is combined with first product stream 100 to in turn produce a combined stream 164. Combined stream 164 can optionally be compressed in a product compressor 166 to produce a compressed hydrogen product stream 168. A part 172 of the second tail gas stream 170 produced by second pressure swing adsorbent unit 156 can be utilized as fuel to the burners of the steam methane reformer 134 as described above. The remaining part 174 can be used as fuel in boilers, furnaces, gas turbines, and duct fired into heat recovery steam generators and etc.

Figure 3:
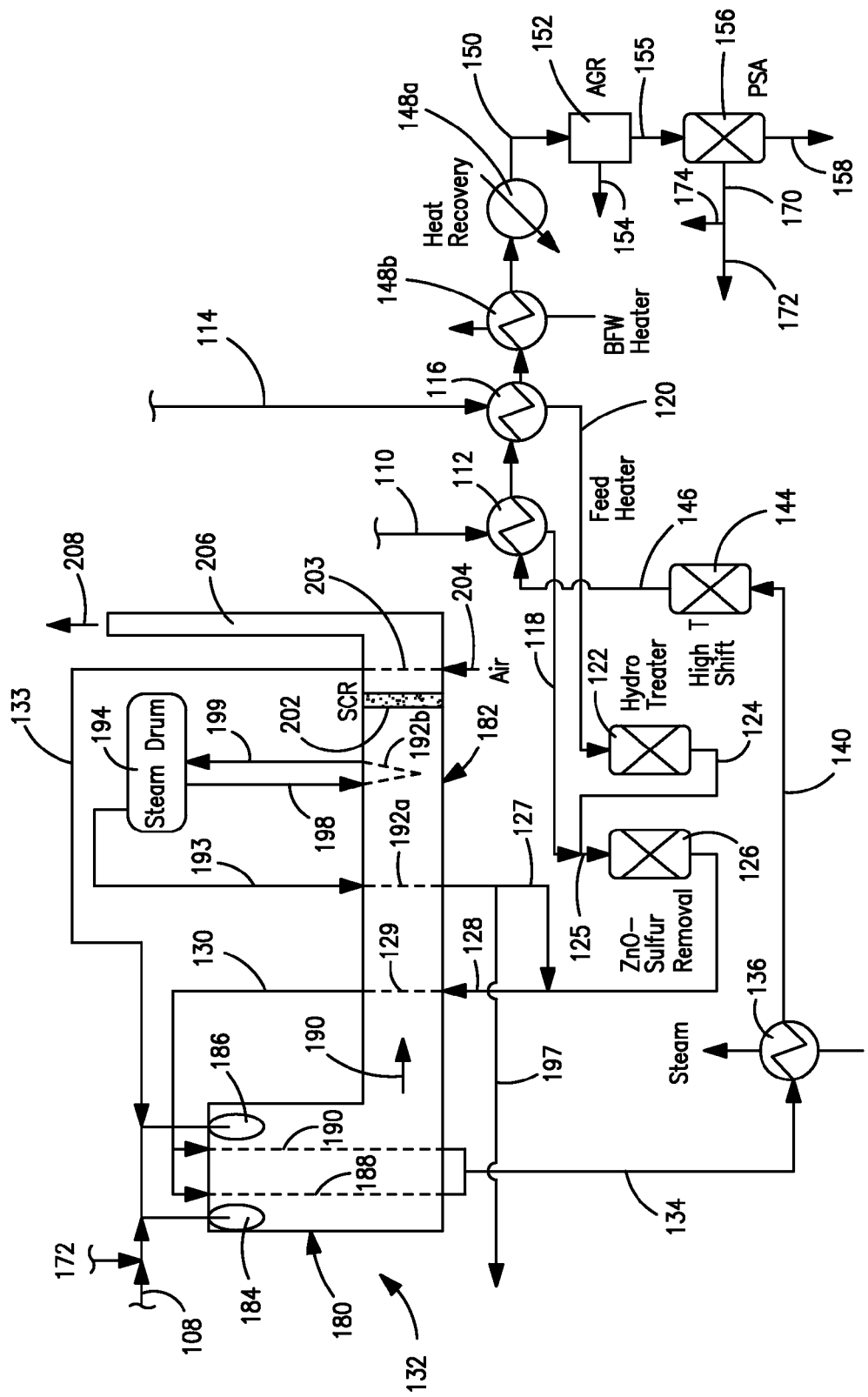
FIG. 3 is a detailed schematic representation of a steam methane reforming system that is used in connection with the present invention.

With reference to FIG. 3, a more detailed schematic is illustrated with respect to the steam methane reforming system 4. Steam methane reforming system 4 is provided with a conventional steam methane reformer 132 that includes a reactor section 180 and a convective section 182. As illustrated, burners 184 and 186 fire into the reactor section 180 to heat reactor tubes 188 and 190 that are fed with the heated combined reactant stream 130 after having been heated. The reactor tubes 188 and 190 in the figure represent several tubes in the SMR furnace. A large furnace could contain several hundred tubes.

A flue gas stream 190 produced from the combustion occurring within reactor section 180 is then used to heat combined reactant stream 128 in heat exchanger 129 that is placed within the convective section 182. Similarly, a heat exchanger 192a and a boiler 192b are provided within convective section to raise steam. A steam stream 193 from a steam drum 194 is superheated within heat exchanger 192a to produce a superheated steam stream 196. Heat exchanger 192a and boiler 192b are depicted within FIG. 2 by reference number 192 and with the legend "HX Boiler". Superheated steam stream 196 is divided into steam stream 127 and an export steam stream 197. The steam is raised within steam drum 194 by passing a boiler water stream 198 into boiler 192b to produce a steam containing stream 199 that is fed back into steam drum 194.

Steam drum 199 is fed with water heated in the gas cooler 148 that typically will consist of a downstream heat rejection heat exchanger 148a and an upstream boiler feed water heater 148b. The heat rejection heat exchanger 148a and the boiler feed water heater 148b are indicated by reference number 148 in FIG. 2. Although not illustrated, but as would be known to those skilled in the art, the resulting heated water discharged from boiler feed water heater 148b would be de-aerated. Although not illustrated in FIG. 2, second shifted gas stream 146 also passes through heat exchangers 112 and 116 to preheat the feeds.

The flue gas stream 182 can pass through a selective catalytic reduction unit 202 ("SCR") to convert nitrogen oxides to nitrogen and water that are contained within the flue gas stream 190. The low NOx flue gas stream 190 then passes into an air preheater 203 to heat an air stream 204 into the heated combustion air stream 133. The flue gas stream is then discharged from a flue gas stack 206 as stack gas stream 208.

It is to be noted that steam methane reforming system 4 is shown for exemplary purposes in that there are potentially different designs for a steam methane reforming system that could be used in connection with the present invention. It is not intended that the present invention be limited to such illustrated system. However, as used herein and in the claims, the term, "steam methane reforming system" means an installation in which steam methane reforming is conducted, superheated steam is generated and optionally export steam, the resulting reformed stream is subjected to water-gas shift reactions in one or more shift conversion units, hydrogen is separated in one or more pressure swing adsorption units and associated heat exchangers are provided to generate the steam, provide necessary cooling of and heating for the various process streams as described above.

The following table illustrates calculated examples of the operation of steam methane reforming system 4 that in a first case labeled "NG Only Feed to SMR" is operated with natural gas alone and in a second case labeled "Syngas Feed to SMR" with a compressed tail gas stream 110 and a hydrocarbon containing stream 114 that is made up of natural gas. Moreover, the burners 184 and 186 of the steam methane reformer 184 are part fired with natural gas, designated in the table as "NG Makeup Fuel", and part 172 of a second tail gas stream 170. In this calculated example, all of second tail gas stream 102 is sent to the steam methane reforming system 4 as compressed tail gas stream 110.

The "Net Energy (after steam and TG credit)" used in the table below means the total energy of the feeds to the steam methane reforming system 4 less the energy of the export steam stream 197 and less the energy of the part 174 of the second tail gas stream 170 that is exported. Thus, in the case of only natural gas making up the feed to the steam methane reformer 132 ("NG ONLY Feed to SMR"), the total energy would be that of the natural gas alone. When compressed tail gas stream 110 is additionally used ("Syngas Feed to SMR") the total energy is the sum of that of the hydrocarbon containing stream 114 (natural gas) and the compressed tail gas stream 110. As known in the art, the term "HHV" means the high heating value of a stream.

TABLE

|  |  | NG Only Feed to SMR | Syngas Feed to SMR |
|---|---|---|---|
| Hydrogen Production | MMSCFD | 100.0 | 100.0 |
| Export steam stream 197 | lb/hr | 154,900 | 137,600 |
| Remaining part 174 of PSA tail gas stream 170 | MMSCFD |  | 37 |
| Remaining part 174 of PSA tail gas stream 170 | MMBtu/hr |  | 290 |
| *Net Energy (after steam and TG credit) | Btu(HHV)/scfH2 | 377.5 | 367.9 |
| Hydrocarbon containing feed stream 114 (natural gas) | MMSCFD | 39.2 | 11.8 |
| Compressed tail gas stream 110 | MMSCFD | 0.0 | 115.0 |
| NG Makeup Fuel | MMSCFD | 3.00 | 0.46 |
| Natural Gas (HHV) | Btu/scf | 1012 | 1012 |
| Compressed tail gas stream 110 (HHV) | Btu/scf |  | 311 |
| Remaining part 174 of PSA tail gas stream 170 (HHV) | Btu/scf |  | 190 |
| Hydrocarbon containing feed stream 114 | MMBtu (HHV)/hr | 1653 | 498 |
| Compressed tail gas stream 110 | MMBtu (HHV)/hr | 0 | 1490 |
| NG Makeup Fuel | MMBtu (HHV)/hr | 127 | 19 |
| Total Energy to SMR (HHV) | MMBtu/hr | 1,779 | 2,007 |
| Export steam stream 197 | MMBtu/hr | 207.1 | 184.0 |
| Part 174 of second tail gas stream 170 | MMBtu/hr | 0 | 290.0 |
| Net Energy (after steam & TG credit) | MMBtu/hr | 1,572 | 1,533 |
| S:C Ratio (w/o CO) |  | 2.8 | 9.2 |
| S:C Ratio (with CO) |  | 2.8 | 1.6 |
| O2 in flue gas stream 190 | % (dry) | 1.4 | 7.5 |
| Makeup Fuel % |  | 16 | 4.6 |
| Absorbed Duty | MMBtu/hr | 389 | 130 |
| Methane Slip | % | 6.1 | 4.4 |
| Process Steam (stream 127) | lb/hr | 218,600 | 216,300 |
| SMR Temp | F. | 1571 | 1571 |
| % Volumetric Feed from compressed tail gas stream 110 |  | 0 | 90 |
| % Energy (HHV) from compressed tail |  | 0 | 74 |

TABLE-continued

| | | NG Only Feed to SMR | Syngas Feed to SMR |
|---|---|---|---|
| gas stream 110 | | | |
| Compressed tail gas stream 110 composition: Hydrogen | | na | 47.1% |
| CO | | na | 48.9% |
| CO2 | | na | 1.2% |
| Contained Hydrogen in compressed tail gas stream 110 | MMSCFD | na | 54.2 |
| Contained CO | MMSCFD | na | 56.2 |
| Contained CO2 | MMSCFD | na | 1.4 |
| Purified second shift gas stream 155 composition: Hydrogen | | 73.5% | 60.6% |
| Nitrogen | | 0.5% | 1.5% |
| Argon | | 0.0% | 0.8% |
| CO | | 3.3% | 6.3% |
| CO2 | | 16.2% | 25.9% |
| Methane | | 6.2% | 4.4% |
| Cooled reformed stream 140 | F. | 626 | 620 |
| Second shifted gas stream 146 | F. | 755 | 799 |

In both cases the production is maintained at 100 MMSCFD. However as seen from the absorbed duty numbers, there is a potential to increase the hydrogen production when operating in the mode utilizing the compressed tail gas stream 110. However, when the compressed tail gas stream 110 is used, there is less steam available for export, owing to less heat recovery available in this mode. Further, in this example, all of the tail gas produced in the "NG Only Feed to SMR" case is used as fuel to the SMR burners. Only a portion, however, as part 172 of tail gas stream 170 (57 percent) is used in the case "Syngas feed to SMR" in which the compressed tail gas stream 100 is also used. In such case the rest is exported and the amount and the corresponding heating value are shown in the Table. The net energy in the case of using the compressed tail gas stream 110 (after taking the steam and PSA tail gas export credits) is lower and system 4 is more efficient than in the case in which natural gas is used alone.

It is to be further noted that in the example, the amount and heating values of the tail gas stream and natural gas feeds are the same in both cases. Some amount of natural gas is also used as makeup fuel for the steam methane reformer 132 for control purposes. About 5 percent of the fuel contribution comes from natural gas, and this is sufficient for control purposes.

The amount of steam provided as steam stream 127 in both the cases is held about the same (~218,000 lb/hr). The result is high steam to carbon ratio for the case in which the second tail gas stream is used when carbon monoxide is not accounted in the carbon count. However, the steam to carbon ratio when carbon monoxide is accounted for is 1.6. The high steam is necessary to prevent carbon formation that may result from the high carbon monoxide content in the SMR feed.

The oxygen content of the flue gas in the mode in which the compressed tail gas stream 110 is used is 7.5 percent which is much higher than that in natural gas alone case. The higher excess air helps maintain the fired duty of the steam methane reformer 132 as well as makes the equipment design for the two modes more compatible. The absorbed duty of the mode using the second tail gas stream is about one third of that when natural gas is used alone. Since the steam methane reformer acts more as a shift reactor in the case using the tail gas, less endothermic reforming reaction occurs compared to the natural gas case.

The methane slip in the mode using the second tail gas stream is lower than the natural gas alone mode owing to high steam to carbon ratio. The steam methane reformer process exit temperature is held constant at 1571° F. in both cases. A last point is that the feed to the second pressure swing adsorption unit 156 in the case in which the second tail gas stream is used has a higher impurity content and thus, the unit 156 would have to be designed for higher impurity levels as compared with the natural gas alone case. As an alternative, adsorbent beds might be added at a later point when the steam methane reformer is able to switch from a feed of natural gas alone to a feed that also uses the compressed tail gas stream 110.

While the present invention has been described with reference to a preferred embodiment, as will occur to those skilled in the art, numerous changes, additions and omissions can be made without departing from the spirit and scope of the present invention as set forth in the presently pending claims.

What is claimed is:

1. A method of producing a hydrogen product from a synthesis gas stream formed by gasifying a carbonaceous feedstock, said method comprising:
preheating a feed stream comprising the synthesis gas stream and introducing the feed gas stream into a first shift conversion unit to form a first shifted gas stream;
cooling the first shifted gas stream and introducing the first shifted gas stream into an acid gas removal unit to remove carbon dioxide and sulfur from the first shifted gas stream and thereby form a purified first shifted gas stream;
separating part of the hydrogen product from the purified first shifted gas stream in a first pressure swing adsorption unit, thereby to also produce a first tail gas stream;
heating a combined reactant stream in a steam methane reforming system and subjecting the combined reactant stream to steam methane reforming to produce a reformed stream, the combined reactant stream formed by combining steam with at least part of the first tail gas stream and a hydrocarbon containing stream, after having been preheated, the hydrocarbon containing stream and steam being combined at a flow rate such that methanation is at least prevented within the steam methane reformer;

cooling the reformed stream and introducing the reformed stream into a second shift conversion unit to produce a second shifted gas stream from the reformed stream; and cooling the second shifted gas stream and separating a remaining part of the hydrogen product therefrom in a second pressure swing adsorption unit, thereby to also produce a second tail gas stream.

2. The method of claim 1, wherein the combined reactant stream is subjected to steam methane reforming within a reactant section of a steam methane reformer of the steam methane reformer system that is fired by a fuel and the second tail gas stream is utilized as part of the fuel for firing the steam methane reformer.

3. The method of claim 2, wherein part of the first tail gas stream is used to form the combined reactant stream and a remaining part of the first tail gas stream is also utilized as part of the fuel for tiring the steam methane reforming system.

4. The method of claim 1, wherein:
the first shifted gas stream contains between about 75 percent and about 80 percent less carbon monoxide than the synthesis gas stream;
the first tail gas stream contains between about 40 mole percent and about 50 mole percent hydrogen and a remaining fraction of the first tail gas stream is at least about 90 percent by volume, carbon monoxide; and
a steam to carbon ratio of the combined reactant stream is at least about 1.0.

5. The method of claim 4 wherein the steam to carbon ratio is at least about 1.5.

6. The method of claim 5, wherein a hydrogen to carbon monoxide ratio in the reformed stream is about 3.0 and increases to a level of at least about 20.0 within the second shifted gas stream.

7. A method of producing a hydrogen product within a hydrogen producing facility, said method comprising:
operating a steam methane reforming system both during an initial time of operation and a subsequent time of operation by:
heating a combined reactant stream and subjecting the combined reactant stream to steam methane reforming to produce a reformed stream;
cooling the reformed stream, subjecting the reformed stream to a water-gas shift reaction to produce a gas stream enriched in hydrogen and thereafter, cooling the gas stream and separating hydrogen therefrom through pressure swing adsorption;
at the initial time of operation of the hydrogen producing facility producing all of the hydrogen product from the steam methane reforming system by forming the combined reactant stream from a hydrocarbon containing stream and steam;
at the subsequent time of operation of the hydrogen producing facility, retrofitting the hydrogen producing facility with a synthesis gas processing system configured to produce part of the hydrogen product from a feed gas stream comprising synthesis gas produced by gasifying a carbonaceous feed within a gasifier;
the part of the hydrogen product being produced in the synthesis gas processing system by:
preheating the feed gas stream and introducing the feed gas stream into a shift conversion unit to form a shifted gas stream;
cooling the shifted gas stream and introducing the shifted gas stream into an acid gas removal unit to remove carbon dioxide and sulfur from the shifted gas stream and thereby form a purified shifted gas stream; and
separating the part of the hydrogen product from the purified first shifted gas stream in a pressure swine adsorption unit, thereby to also produce a tail gas stream: and
at the subsequent time of operation, the steam methane reforming system producing a remaining part of the hydrogen product by forming the combined reactant stream by combining the steam with at least part of the tail gas stream and the hydrocarbon containing stream, after having been preheated, the hydrocarbon containing stream being combined at a flow rate such that methanation is at least prevented within the steam methane reformer and hydrogen being separated by the pressure swing adsorption being conducted in the steam methane reforming system constituting the remaining part of the hydrogen product.

8. The method of claim 7, wherein:
the shifted gas stream contains between about 75 percent and about 80 percent less carbon monoxide than the synthesis gas stream; and
the tail gas stream contains between about 40 mole percent and about 50 mole percent hydrogen and a remaining fraction of the tail gas stream is at least about 90 percent by volume, carbon monoxide.

9. The method of claim 7, wherein:
the hydrocarbon containing stream is natural gas;
the hydrocarbon containing stream is preheated and then treated in a hydrotreater to convert sulfur species to hydrogen sulfide;
the tail gas stream is preheated and then combined with the hydrocarbon containing stream downstream of the hydrotreater to form a combined stream;
the combined stream is introduced into an adsorbent bed to remove the hydrogen sulfide; and
the combined stream downstream of the adsorbent bed is combined with the steam to form the combined reactant stream.

10. The method of claim 7, wherein the tail gas stream produced by the synthesis gas processing system is a first tail gas stream, the combined reactant stream is subjected to steam methane reforming within a reactant section of steam methane reformer of the steam methane reformer system that is fired by a fuel, the pressure swing adsorption carried out in the steam methane reforming system produces a second tail gas stream and the second tail gas stream is utilized as part or the fuel for firing the steam methane reformer.

11. The method of claim 10, wherein during the subsequent time of operation, part of the first tail gas stream is used to form the combined reactant stream and a remaining part of the first tail gas stream is also utilized as part of the fuel for firing the steam methane reforming system.

12. The method of claim 7, wherein during the initial time of operation, the steam methane reformer operates at a steam to carbon ratio of at least about 2.0 and at the subsequent time of operation, the steam methane reformer operates at a steam to carbon ratio of at least about 1.0.

13. The method of claim 12, wherein the steam to carbon ratio at the subsequent nine of operation is at least about 1.5.

14. he method of claim 13, wherein during the subsequent time of operation, a hydrogen to carbon monoxide ratio in the reformed stream is about 3.0 and is raised to a level greater than at least 20.0 through the water-gas shift reaction.

* * * * *